(12) United States Patent
Jiang et al.

(10) Patent No.: US 12,448,279 B2
(45) Date of Patent: Oct. 21, 2025

(54) SEMICONDUCTOR STRUCTURE AND METHOD OF MANUFACTURING THE SAME

(71) Applicant: TAIWAN SEMICONDUCTOR MANUFACTURING COMPANY LTD., Hsinchu (TW)

(72) Inventors: Jheng-Hong Jiang, Hsinchu (TW); Shing-Huang Wu, Hsinchu (TW); Chia-Wei Liu, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 426 days.

(21) Appl. No.: 17/816,231

(22) Filed: Jul. 29, 2022

(65) Prior Publication Data

US 2024/0034617 A1 Feb. 1, 2024

(51) Int. Cl.
*B81C 1/00* (2006.01)
*B81B 3/00* (2006.01)

(52) U.S. Cl.
CPC ........ *B81B 3/0075* (2013.01); *B81C 1/00674* (2013.01); *B81B 2201/0235* (2013.01); *B81B 2201/0242* (2013.01); *B81B 2201/0257* (2013.01); *B81B 2203/0118* (2013.01); *B81B 2203/04* (2013.01); *B81C 2201/0197* (2013.01)

(58) Field of Classification Search
CPC ........ B81C 1/00674; B81C 2201/0197; B81B 3/0075; B81B 2201/0235; B81B 2201/0242; B81B 2201/0257; B81B 2203/0118; B81B 2203/04; B81B 3/0072; B81B 2201/033
See application file for complete search history.

(56) References Cited

U.S. PATENT DOCUMENTS

| | | | | |
|---|---|---|---|---|
| 2009/0115061 | A1* | 5/2009 | Chen | ................ H01L 21/76807 257/E23.141 |
| 2013/0021304 | A1* | 1/2013 | Zuo | .................... H03H 9/02228 345/204 |
| 2013/0135264 | A1* | 5/2013 | Black | ..................... H03H 9/178 216/13 |
| 2018/0194615 | A1* | 7/2018 | Nawaz | ................. B81B 3/0027 |
| 2020/0066793 | A1* | 2/2020 | Lin | ..................... H01L 21/7682 |

* cited by examiner

*Primary Examiner* — Moazzam Hossain
(74) *Attorney, Agent, or Firm* — WPAT LAW; Anthony King

(57) ABSTRACT

A semiconductor structure is provided. The semiconductor structure includes a substrate, a pillar structure, a fin structure, and a buffering structure. The pillar structure is disposed on the substrate. The fin structure is connected to the pillar structure and is separate from the substrate. The buffering structure is disposed in the fin structure and includes a soft material layer and an air gap surrounded by the soft material layer. A method of manufacturing the semiconductor structure is also provided.

20 Claims, 18 Drawing Sheets

SEMICONDUCTOR STRUCTURE AND METHOD OF MANUFACTURING THE SAME

BACKGROUND

Recent developments in semiconductor integrated circuit (IC) technology include microelectromechanical system (MEMS) devices. MEMS devices include mechanical and electrical features formed by one or more semiconductor manufacturing processes. Examples of MEMS devices include micro-sensors, which convert mechanical force into electrical signals; micro-actuators, which convert electrical signals into mechanical force; and motion sensors, which are commonly found in automobiles (e.g., in airbag deployment systems). For many applications, MEMS devices include a floating fin, a membrane or a film suspended in air. Commonly, the floating or suspended structure can be easily damaged during motion. Improvements are therefore required.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION

Figure 1:
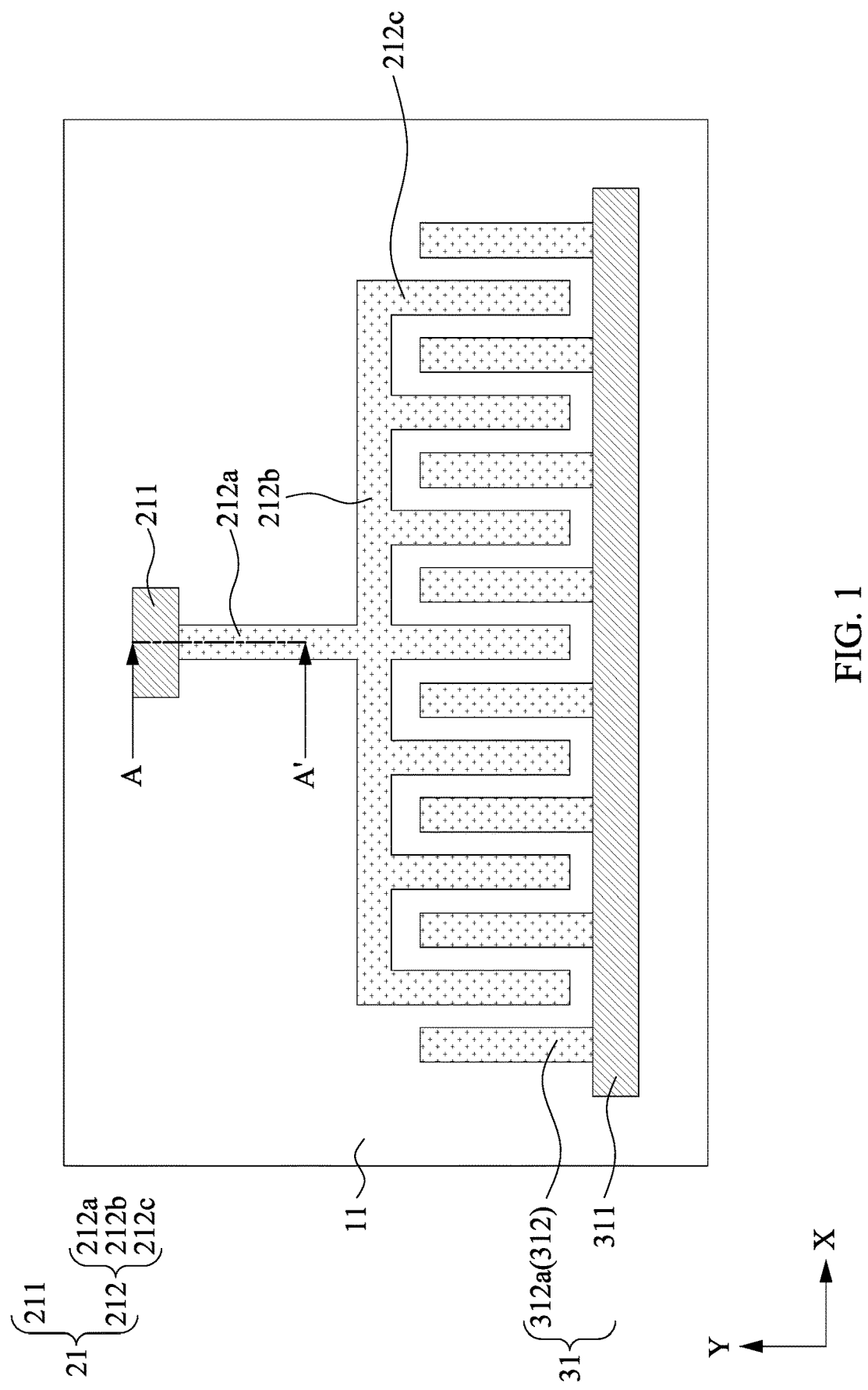
FIG. 1 is a schematic top-view diagram of a semiconductor structure in accordance with some embodiments of the disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context. In addition, the term "source/drain region" or "source/drain regions" may refer to a source or a drain, individually or collectively dependent upon the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic top view of a semiconductor structure in accordance with some embodiments of the present disclosure. The semiconductor structure can be a micro-electro-mechanical system (MEMS). The semiconductor structure includes a substrate 11, a first structure 21 and a second structure 31 disposed over the substrate 11. The semiconductor structure may include an accelerator, a fin structure, a gyroscope, a bond holder, a microphone, or a combination thereof. For a purpose of illustration, a gyroscope, as shown in FIG. 1, is used as an exemplary embodiment. In some embodiments, the first structure 21 and the second structure 31 are a first electrode 21 and a second electrode 31, respectively, of a gyroscope. In some embodiments, the first structure 21 or the second structure 31 may be referred to as a first fin structure or a second fin structure. For ease of illustration, the first structure 21 and the second structure 31 are referred to as the first electrode 21 and the second electrode 31 in the following description. Each of the first electrode 21 and the second electrode 31 may be an interdigital electrode. The first electrode 21 and the second electrode 31 may have similar or different configurations. For example, as shown in FIG. 1, the first electrode 21 and the second electrode 31 are both interdigital electrodes but with different configurations.

In some embodiments, the first electrode 21 includes a fixed member 211 and a floating member 212. The fixed member 211 can be a part of the first electrode 21 connected to, contacting, or fixed on the substrate 11, and the floating member 212 may a part of the first electrode 21 separated from the substrate 11. The floating member 212 can be held on the substrate 11 through the support of the fixed member 211. In some embodiments, the fixed member 211 and the floating member 212 are conductive. In some embodiments, the floating member 212 is electrically connected to the substrate 11 through the fixed member 211.

Configurations of the fixed member 211 and the floating member 212 can be adjusted according to different applications. In some embodiments, the fixed member 211 has a rectangular configuration from a top view as shown in FIG. 1. In some embodiments, the floating member 212 includes a first portion 212a, a second portion 212b and a third portion 212c. In some embodiments, the first portion 212a is connected to the fixed member 211, the second portion 212b is connected to the first portion 212a, and the third portion 212c is connected to the second portion 212b. In some embodiments, the floating member 212 has a brush-like or a tree-like configuration. The first portion 212a can be considered as a trunk portion of the floating member 212, the second portion 212b can be considered as a branch portion branching out from the first portion 212a, and the third portion 212c can be considered as a leaf portion branching out from the second portion 212c. It should be noted that the wordings "trunk", "branch" and "leaf" are for a purpose of showing different layers of a hierarchy of the floating member 212 from the fixed member 211, and are not intended to limit the present disclosure.

In some embodiments, the first portion 212a extends along a first direction (e.g., a direction Y). In some embodiments, the second portion 212b extends along a second direction (e.g., a direction X) substantially perpendicular to the first direction. In some embodiments, the third portion 212c is substantially parallel to the first portion 212a. In some embodiments, the third portion 212c extends along the first direction. The third portion 212c may include several leaves parallel to one another along the second direction. In some embodiments, each of the leaves may include one free end and another end connected to the second portion 212b. A number of the leaves of the third portion 212c is not limited herein. In some embodiments, the first portion 212a is connected to a middle of the second portion 212b for purpose of better support.

In accordance with some embodiments of the present disclosure, as shown in FIG. 1, the second electrode 31 may have a brush-like configuration, which is different from that of the first electrode 21. In some embodiments, the second electrode 31 includes a fixed member 311 and a floating member 312. Similar to the first electrode 21, the fixed member 311 may connect to, contact, or be fixed on the substrate 11, and the floating member 312 may be separated from the substrate 11. The floating member 312 can be held on the substrate 11 through the fixed member 311. In some embodiments, the fixed member 311 is considered as a branch portion of the second electrode 31, and the floating member 312 is considered as a leaf portion of the second electrode 31.

In some embodiments, the fixed member 311 and the floating member 212 are conductive. In some embodiments, the floating member 312 is electrically connected to the substrate 11 through the fixed member 311. In some embodiments, the fixed member 311 extends along the second direction. In some embodiments, the floating member 312 includes several slots 312a parallel to one another and arranged along the second direction. Each of the slots 312a is connected to the fixed member 311 at one end, and the other end of the slot 312a is free end extending toward the second portion 212b of the floating member 212. In some embodiments, the slots 312a of the floating member 312 are alternately arranged with the slots of the third portion 212c of the floating member 212 for a purpose of measurement of capacitances between the first electrode 21 and the second electrode 31. In some embodiments, each of the slots 312a is substantially parallel to the third portion 212c. In some embodiments, each of the slots 312a extends along the first direction. A number of the slots 312a of the floating member 312 is not limited herein. In some embodiments, a length of the fixed member 311 along the second direction is according to the number of the slots 312a or according to a total width of the floating member 312 along the second direction.

Figure 2:
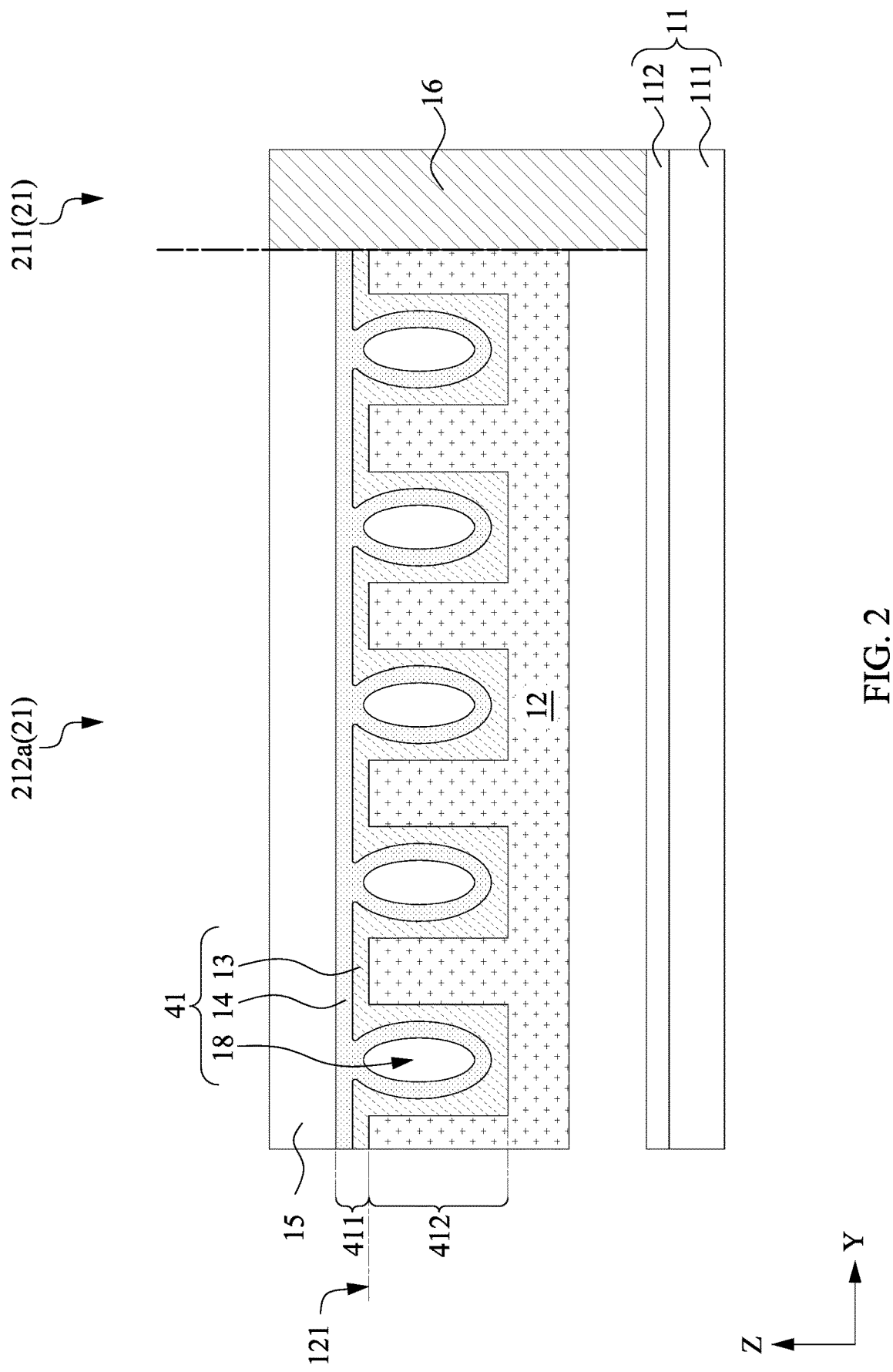
FIG. 2 is a schematic cross-sectional diagram of a semiconductor structure in accordance with some embodiments of the disclosure.

FIG. 2 is a schematic cross-sectional diagram of the semiconductor structure shown in FIG. 1 along a line A-A' in accordance with some embodiments of the present disclosure. FIG. 2 is for a purpose of showing an inner structure of the floating member 212, and it should be noted that the structure of the floating member 212 shown in FIG. 2 can be applied in the second portion 212b, the third portion 212c, or the slots 312a. In some embodiments, the fixed member 211 is made of a conductive material 16. In some embodiments, the fixed member 211 has a pillar configuration. In some embodiments, the substrate 11 includes a substrate layer 111 and a dielectric layer 112 over the substrate layer 111. The dielectric layer 112 can be a single layer or a multi-layer structure. In some embodiments, the dielectric layer 112 includes oxide, nitride, oxynitride or a combination thereof. In some embodiments, the dielectric layer 112 includes a pad oxide sub-layer and a silicon nitride sub-layer sequentially arranged over the substrate layer 111.

In some embodiments, the floating member 212 includes a first conductive layer 12 and a second conductive layer 15. The first conductive layer 12, the second conductive layer 15 and the fixed member 211 may have same or different conductive materials depending on different applications. In some embodiments, the conductive material includes copper (Cu), aluminum (Al), titanium (Ti), tantalum (Ta), lead (Pb), tungsten (W), an alloy thereof, or a combination thereof. In some embodiments, the first conductive layer 12 and the second conductive layer 15 are electrically connected to the fixed member 211. In some embodiments, the first conductive layer 12 and the second conductive layer 15 respectively contact the fixed member 211.

The semiconductor structure further includes a buffering structure 41. In some embodiments, the buffering structure 41 includes a first soft material layer 13, a second soft material layer 14, and an air gap 18. The buffering structure 41 may be disposed between the first conductive layer 12 and the second conductive layer 15. In some embodiments, the second conductive layer 15 is separated from the first conductive layer 12 by the buffering structure 41. In some embodiments, the buffering structure 41 extends into the first conductive layer 12 from the second conductive layer 15. In some embodiments, the air gap 18 is disposed within the first conductive layer 12. The air gap 18 may be sealed by the first soft material layer or the second soft material layer 14. In some embodiments as shown in FIG. 2, the air gap 18 is sealed by the second soft material layer 14. In some embodiments, the first soft material layer 13 lines the first conductive layer 12. In some embodiments, the second soft material layer 14 lines the first soft material layer 13 and seals the air gap 18 inside the first conductive layer 12. In some embodiments, the second soft material layer 14 is separated from the first conductive layer 12 by the first soft material layer 13. In some embodiments, the first soft material layer 13 is separated from the second conductive layer 15 by the second soft material layer 14. In some embodiments, a portion of the buffering structure 41 above a top surface 121 of the first conductive layer 12 is defined as a planar portion 411, and a portion of the buffering structure 41 below the top surface 121 of the first conductive layer 12 is defined as a protruding portion 412.

As shown in FIG. 2, as a result of depositions, a portion of the first soft material layer 13 is disposed within the first conductive layer 12, and a portion of the first soft material layer 13 is disposed above the top surface 121 of the first conductive layer 12. Similarly, a portion of the second soft material layer 14 is disposed within the first conductive layer 12 and surrounded by the first soft material layer 13, and a portion of the second soft material layer 14 is disposed above the top surface 121 and between the first soft material layer 13 and the second conductive layer 15. In some embodiments, both of the planar portion 411 and the protruding portion 412 include the portions of the first soft material layer 13 and the second soft material layer 14. In some embodiments, the air gap 18 is disposed in the protruding portion 412. The buffering structure 41 may include multiple protruding portions 412, wherein each of the protruding portions 412 extends from the planar portion 411 into the first conductive layer 12. In some embodiments, each of the protruding portions 412 extends along a third direction (e.g., a direction Z) substantially perpendicular to the substrate 11.

The buffering structure 41 includes materials having a hardness or a structural density less than that of the first conductive layer and/or less than that of the second conductive layer, so as to absorb stress from the first conductive layer and/or the second conductive layer. In some embodiments, the first soft material layer 13 includes dielectric materials, such as silicon oxide, silicon nitride, silicon oxy-nitride, fluoride-doped silicate (FSG), silicon carbide (SIC), nitride-bonded silicon carbide (NSIC), oxide-bonded silicon carbide (OSIC), extra low-k (ELK) dielectric, black diamond (BD), other suitable low-k dielectric materials, suitable porous materials, or a combination thereof. In some embodiments, the first soft material layer 13 includes semiconductive materials, such as doped silicon, single crystalline silicon, polysilicon, amorphous silicon, or a combination thereof. The second soft material layer 14 may include a material from the possible materials of the first soft material layer 13 as illustrated above, and repetition is omitted herein. In some embodiments, a material of the second soft material layer 14 is different from that of the first soft material layer 13. In some embodiments, the buffering structure 41 is referred to as a soft structure 41.

The buffering structure 41 is for a purpose of stress release or stress absorption from the first conductive layer 12 and/or the second conductive layer 15. The soft material (e.g., the first soft material layer 13 and the second soft material layer 14) of the buffering structure 41 can absorb stress from the floating member 212 (e.g., the first conductive layer 12 and/or the second conductive layer 13), and the air gap 18 can release the stress from the soft material. The presence of the buffering structure 41 can prevent damage to the floating member 212 during operation (e.g., measuring orientation or velocity) of a device. The presence of the buffering structure 41 in a device can thereby improve stability and a lifetime of the device.

The gyroscope shown in FIG. 1 is for a purpose of illustrating the concept of the present disclosure. The buffering structure of the present disclosure can be applied in other semiconductor devices including a floating structure, such as an accelerometer, a fin structure, a bond holder, and a microphone.

A method of manufacturing a semiconductor structure similar to the gyroscope shown in FIGS. 1 and 2 is also provided in the disclosure. In order to further illustrate concepts of the present disclosure, various embodiments are provided below. For a purpose of clarity and simplicity, reference numbers of elements with same or similar functions are repeated in different embodiments. However, such usage is not intended to limit the present disclosure to specific embodiments or specific elements. In addition, conditions or parameters illustrated in different embodiments can be combined or modified to have different combinations of embodiments as long as the parameters or conditions used are not in conflict.

Figure 3:
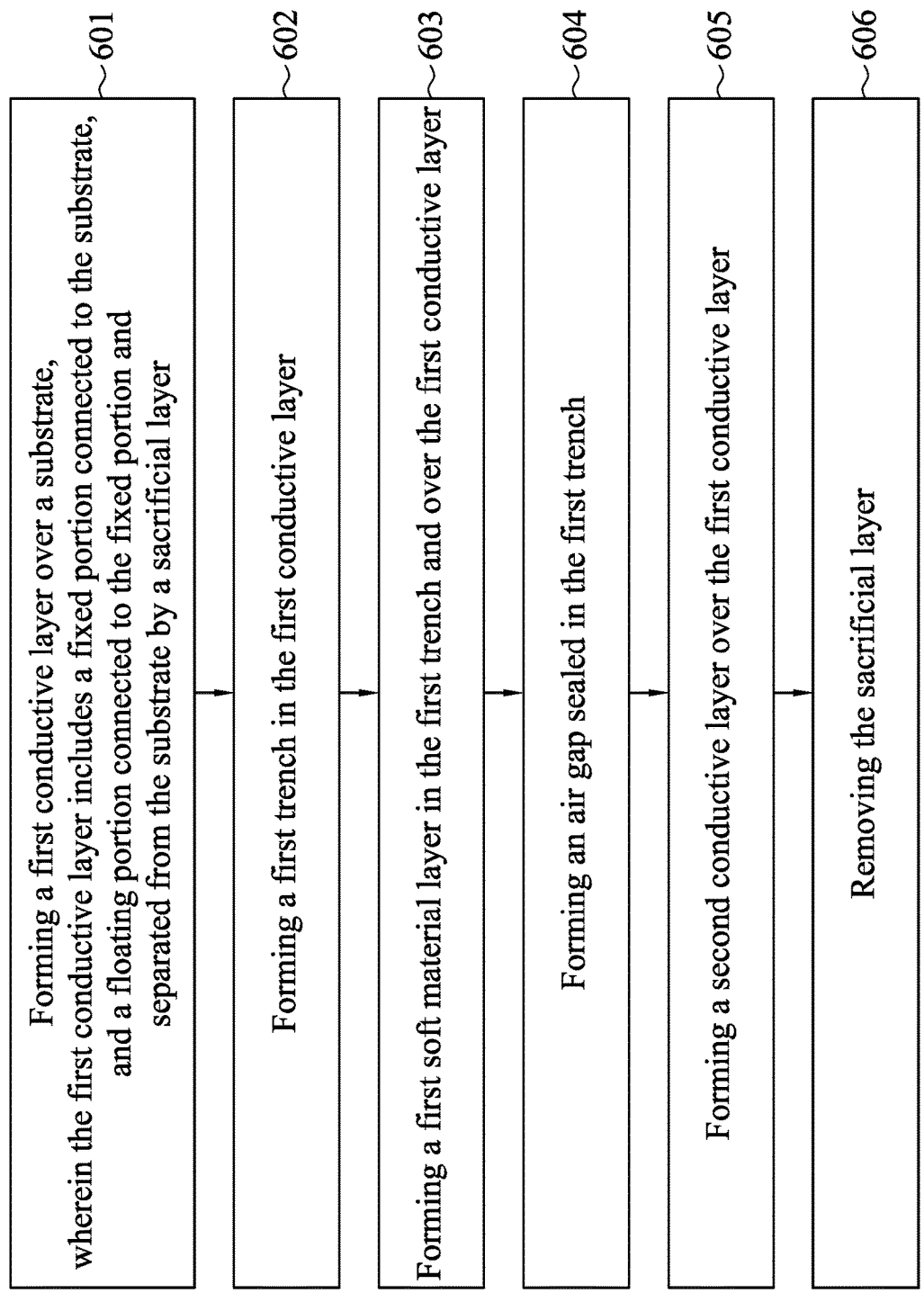
FIG. 3 is a flow diagram of a method of manufacturing a semiconductor structure in accordance with some embodiments of the disclosure.

FIG. 3 is a flow diagram of a method 600 for manufacturing a semiconductor structure in accordance with some embodiments of the present disclosure. The method 600 includes a number of operations (601, 602, 603, 604, 605 and 606) and the description and illustration are not deemed as a limitation to the sequence of the operations. In the operation 601, a first conductive layer is formed over a substrate, wherein the first conductive layer includes a fixed portion connected to the substrate and a floating portion connected to the fixed portion and separated from the substrate by a sacrificial layer. In the operation 602, a first trench is formed in the first conductive layer. In the operation 603, a first soft material layer is formed in the first trench and over the first conductive layer. In the operation 604, an air gap is formed and sealed in the first trench. In the operation 605, a second conductive layer is formed over the first conductive layer. In the operation 606, the sacrificial layer is removed. It should be noted that the operations of the method 600 may be rearranged or otherwise modified within the scope of the various aspects. Additional processes may be provided before, during, and after the method 600, and some other processes may be only briefly described herein. Thus, other implementations are possible within the scope of the various aspects described herein.

Figure 4:
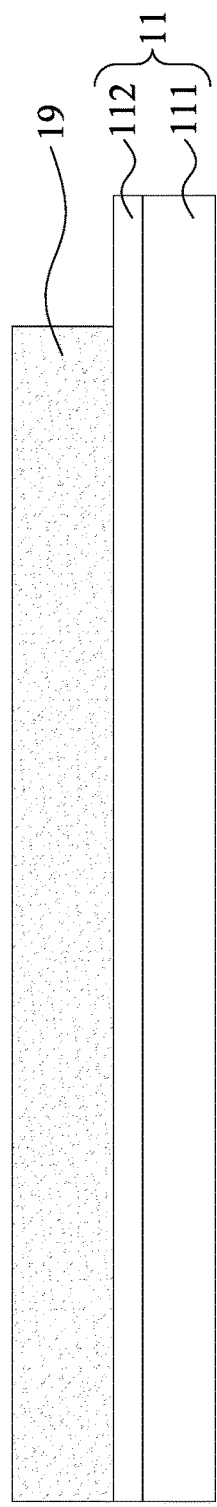
FIGS. 4 to 12 are schematic cross-sectional diagrams and schematic top-view diagrams of a semiconductor structure at different stages of a manufacturing method in accordance with some embodiments of the disclosure.
Figure 4:
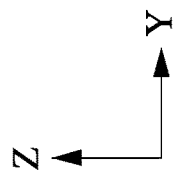

Please refer to FIG. 4, which is a schematic cross-sectional diagram along the line A-A' at a stage of the method 600 in accordance with some embodiments of the present disclosure. Prior to the operation 601, a substrate 11 is provided, and a sacrificial layer 19 is formed over the substrate 11. In some embodiments, the substrate 11 includes a substrate layer 111 and a dielectric layer 112 over the substrate layer 111. The substrate layer 111 may be a bulk substrate (e.g., a silicon wafer) or a semiconductor-on-insulator (SOI) substrate. In one embodiment, the substrate layer 111 may include other semiconductor materials, such as silicon germanium, silicon carbide, gallium arsenide, or the like. In other embodiments, the substrate layer 111 may include semiconductor devices, electrical components, electrical elements or a combination thereof. In some embodiments, the substrate layer 111 includes transistors or functional units of transistors. The semiconductor devices, electrical components, or electrical elements may be formed in the substrate layer 111 following conventional methods of manufacturing semiconductors. The semiconductor devices, electrical components, or electrical elements can be active components or devices, and may include different types or generations of devices. The dielectric layer 112 may be similar to that illustrated in FIG. 2, and detailed description is omitted herein. However, such omission is not intended to limit the present disclosure.

The sacrificial layer 19 may be formed over the substrate 11. In some embodiments, a patterning operation is performed on the sacrificial layer 19 to expose portions of the substrate 11. In some embodiments, the exposed portions of the substrate 11 are at positions of fixed members of electrodes to be formed in subsequent processing. In some embodiments, the sacrificial layer 19 includes silicon or other suitable materials, other than materials of the electrodes and a buffering structure, for a purpose of selective etching. In some embodiments, a thickness 195 of the sacrificial layer 19 defines a distance between the substrate 11 and a floating member to be formed.

Figure 5:
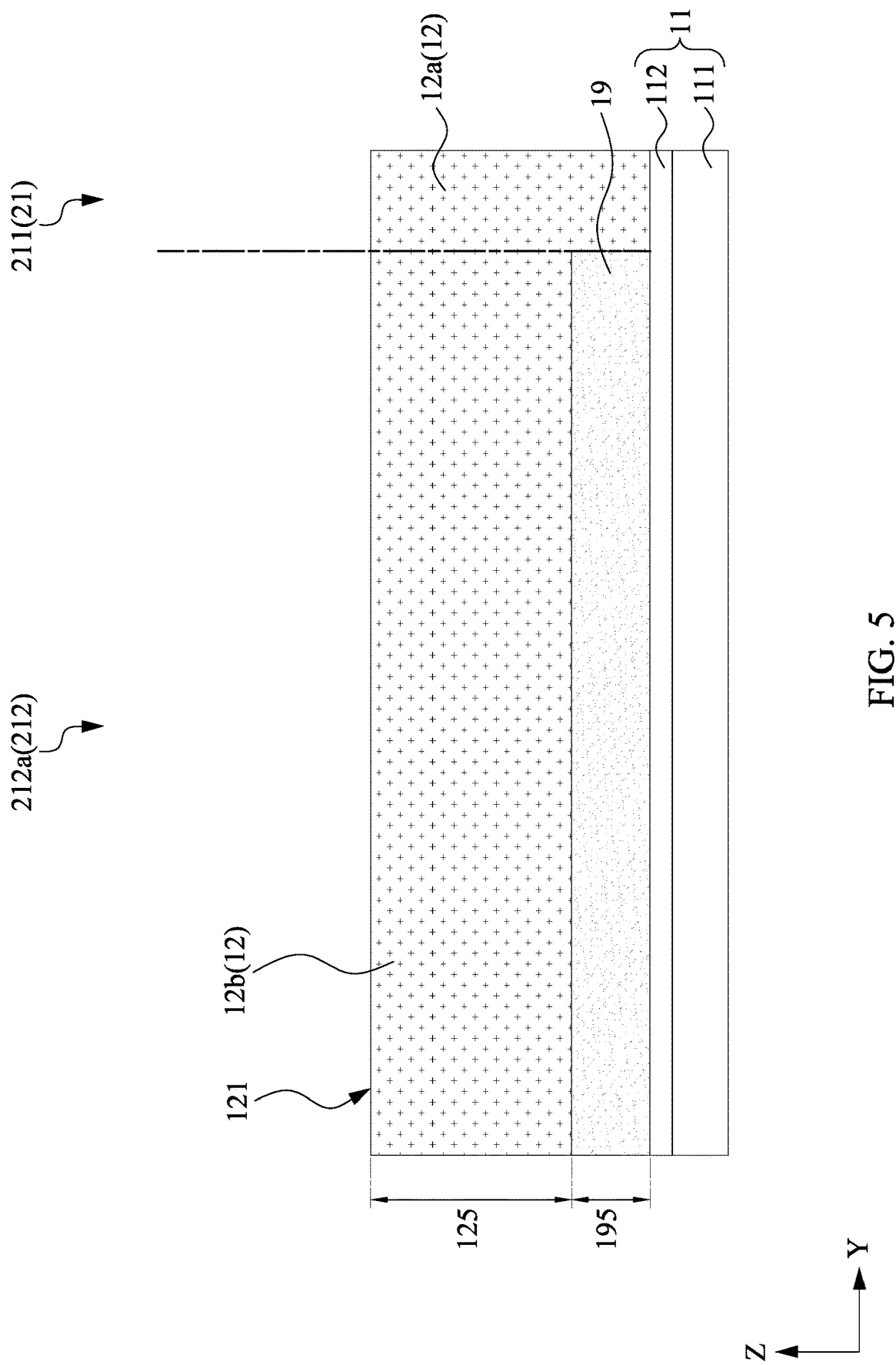

Please refer to FIG. 5, which is a schematic cross-sectional diagram along the line A-A' at a stage of the method 600 in accordance with some embodiments of the present disclosure. In the operation 601, a first conductive layer 12 is formed over the substrate 11 and the sacrificial layer 19. In some embodiments, the first conductive layer 12 is formed by a deposition. A first portion 12a of the first conductive layer 12 is formed over the portion of the substrate 11 exposed through the sacrificial layer 19, and a second portion 12b of the first conductive layer 12 is formed over the sacrificial layer 19 and separated from the substrate 11. The first portion 12a of the first conductive layer 12 may become a portion of a fixed member 211, and the second portion 12b of the first conductive layer 12 may become a portion of a floating member 212. In some embodiments, a planarization, a polishing, or an etching is performed on the first conductive layer 12 to provide a planar top surface 121 of the first conductive layer 12. In some embodiments, a thickness 125 of the first conductive layer 12 over the sacrificial layer 19 is in a range of 10 nm to 200 microns (μm).

Figure 6:
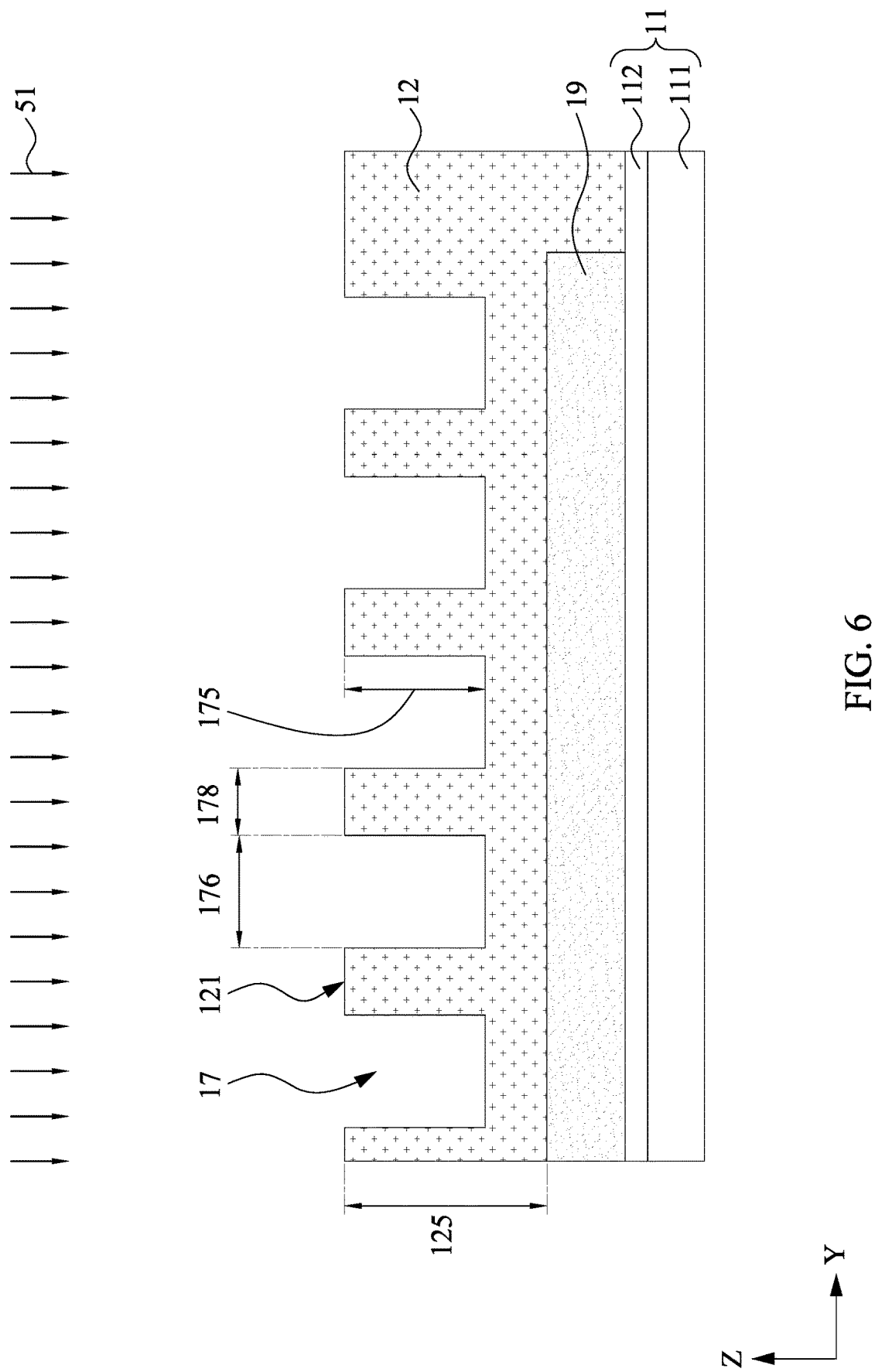
Figure 7:
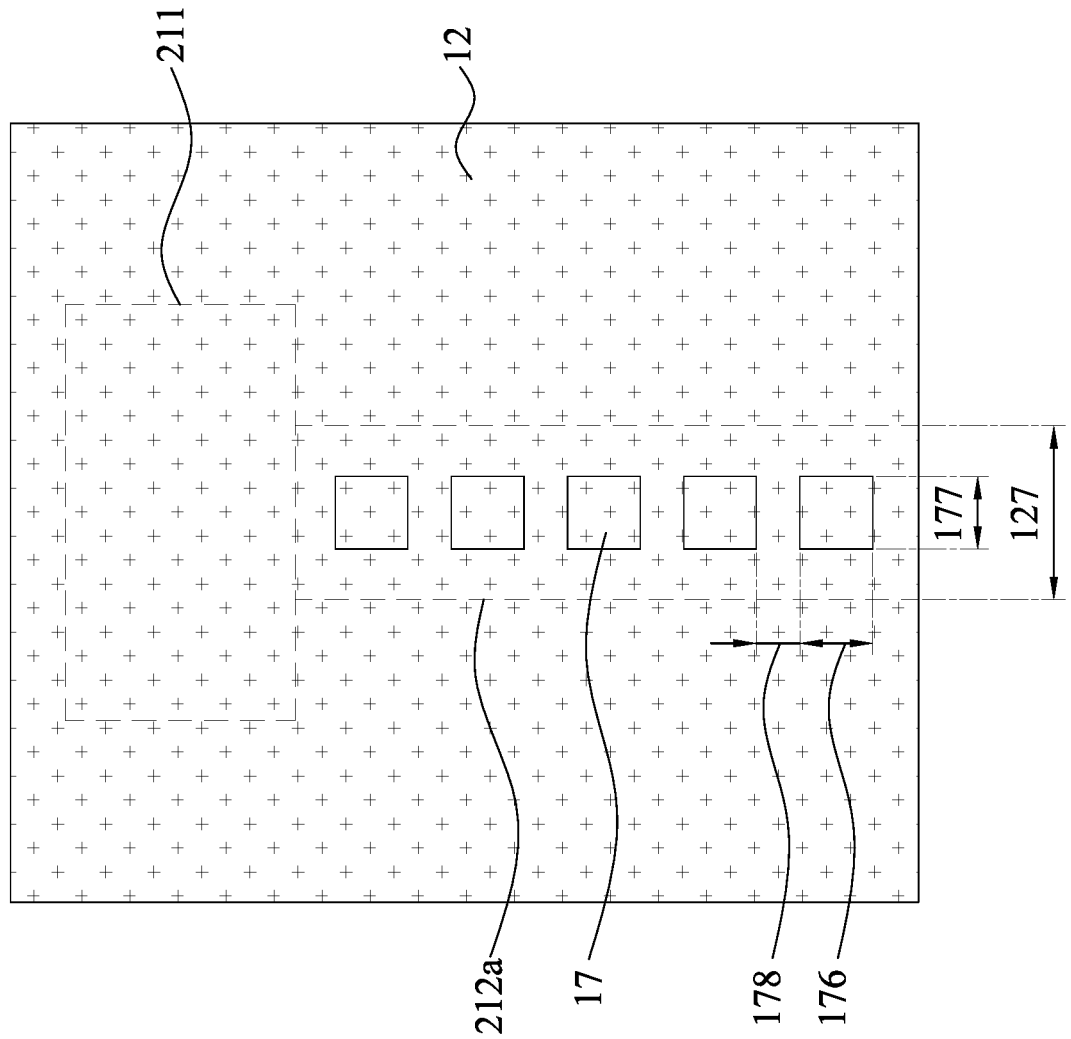

Please refer to FIGS. 6 and 7, wherein FIG. 6 is a schematic cross-sectional diagram along the line A-A' at a stage of the method 600 and FIG. 7 is a schematic top view of the first conductive layer 12 of FIG. 6 in accordance with some embodiments of the present disclosure. In the operation 602, one or more trenches 17 are formed in the first conductive layer 12. The trenches 17 are formed in the floating member 212, which is patterned and defined in subsequent process, and a portion of a first portion 212a of the floating member 212 in accordance with the cross section of FIG. 6 is indicated in a dashed line as shown in FIG. 7. In some embodiments, an etching operation is performed to form the trench 17. A depth 175 along a third direction, a length 176 along a first direction, or a width 177 along a second direction of the trench 17, and a distance 178 along the first direction, can be adjusted according to different applications. The distance 178 may represent a distance between adjacent trenches 17 as shown in FIG. 7 or a distance between an edge of the floating member 212 and a nearest trench 17. In some embodiments, an entirety of the trenches 17 are disposed within the first conductive layer 12. In other words, the depth 175 should be less than the thickness 125 of the first conductive layer 12, and the width 177 should be less than a width 127 of the first portion 212a along the second direction.

A trench pattern density of the first conductive layer 12 should be less than 80% for a purpose of structural stability, wherein the trench pattern density is a percentage of an overall volume of the trenches 17 to a volume of the first conductive layer 12 in an area. For instance, a trench pattern density of the portion of the first portion 212a shown in FIG. 7 should be less than 80%. In some embodiments, the width 177 or the length 176 of the trench 17 is in a range of 2 nm to 80 μm. In some embodiments, the distance 177 between adjacent trenches 17 is in a range of 2 nm to 80 μm. Different distances 177 between different trenches may or may not be equal depending on different applications. In addition, a configuration of a trench 17 can depend on different applications. In some embodiments, the trench 17 has a rectangular configuration as shown in FIG. 7. However, the disclosure is not limited thereto.

Figure 8:
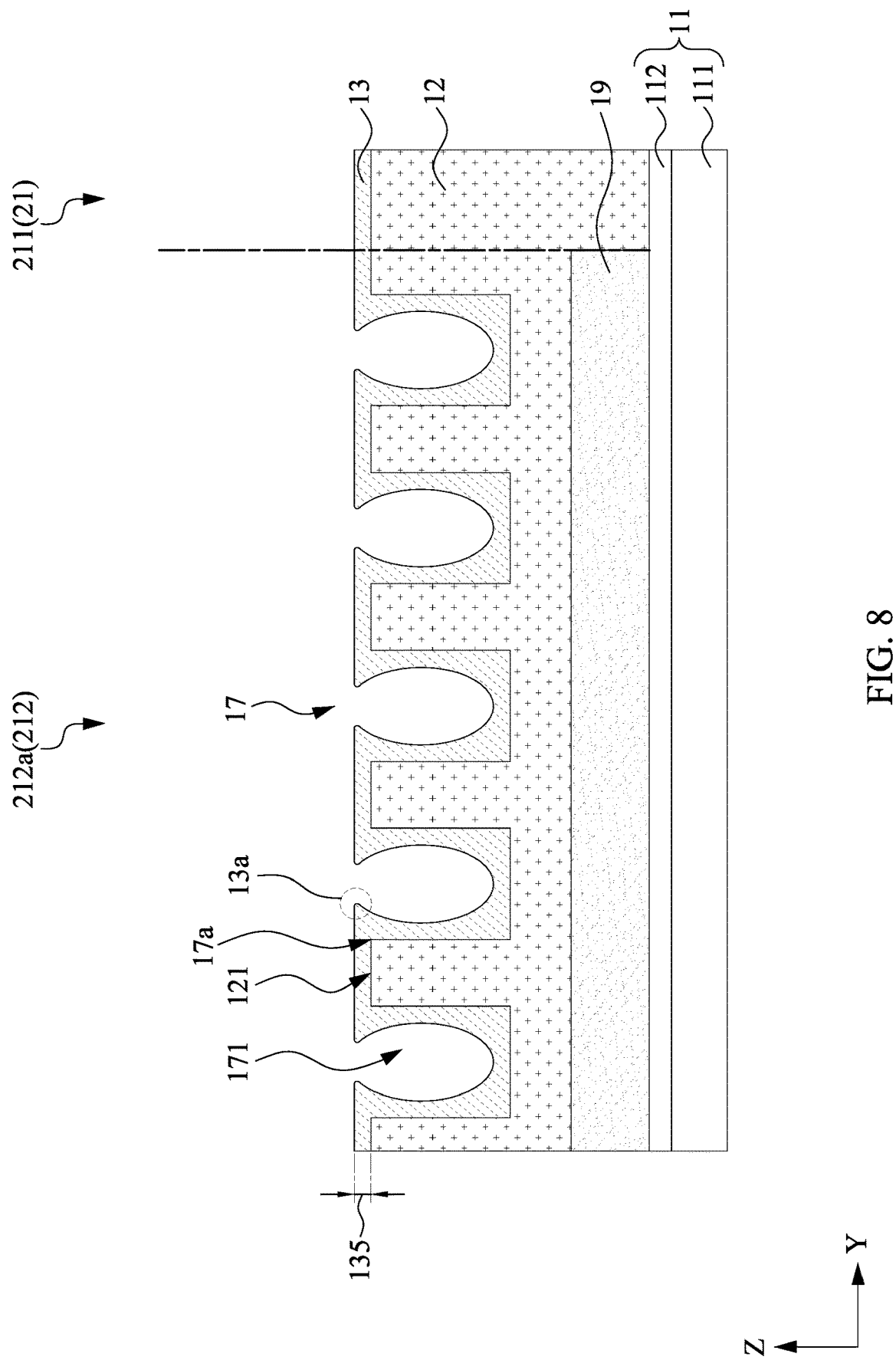

Please refer to FIG. 8, which is a schematic cross-sectional diagram along the line A-A' at a stage of the method 600 in accordance with some embodiments of the present disclosure. In the operation 603, a first soft material layer 13 is formed in the trenches 17 and over the first conductive layer 12. A configuration of the first soft material layer 13 in the trenches 17 and over the first conductive layer 12 depends on a configuration and a dimension (the depth 175, the length 176 and/or the width 177) of the trench 17. In some embodiments, a deposition is performed to form the first soft material layer 13. In some embodiments, the first soft material layer 13 is conformal to a profile of the first conductive layer 12. In some embodiments, the first soft material layer 13 lines the trenches 17 and the top surface 121 of the first conductive layer 12. An auto-seal effect of the deposition may or may not occur depending on the width 177 or the length 176 of a trench 17. In some embodiments as shown in FIG. 8, the first soft material layer 13 includes a suspended portion 13a over the trench 17 and extending from a corner 17a. In some embodiments, the suspended portion 13a seals to form an air gap (not shown in FIG. 8). In some embodiments, the suspended portion 13a does not seal the trench 17, and an open gap 171 is defined by the first soft material layer 13. In some embodiments, the open gap 171 has an oval configuration. In some embodiments, a thickness 135 of the first soft material layer 13 over the top surface 121 is in a range of 2 nm to 80 μm.

Figure 9:
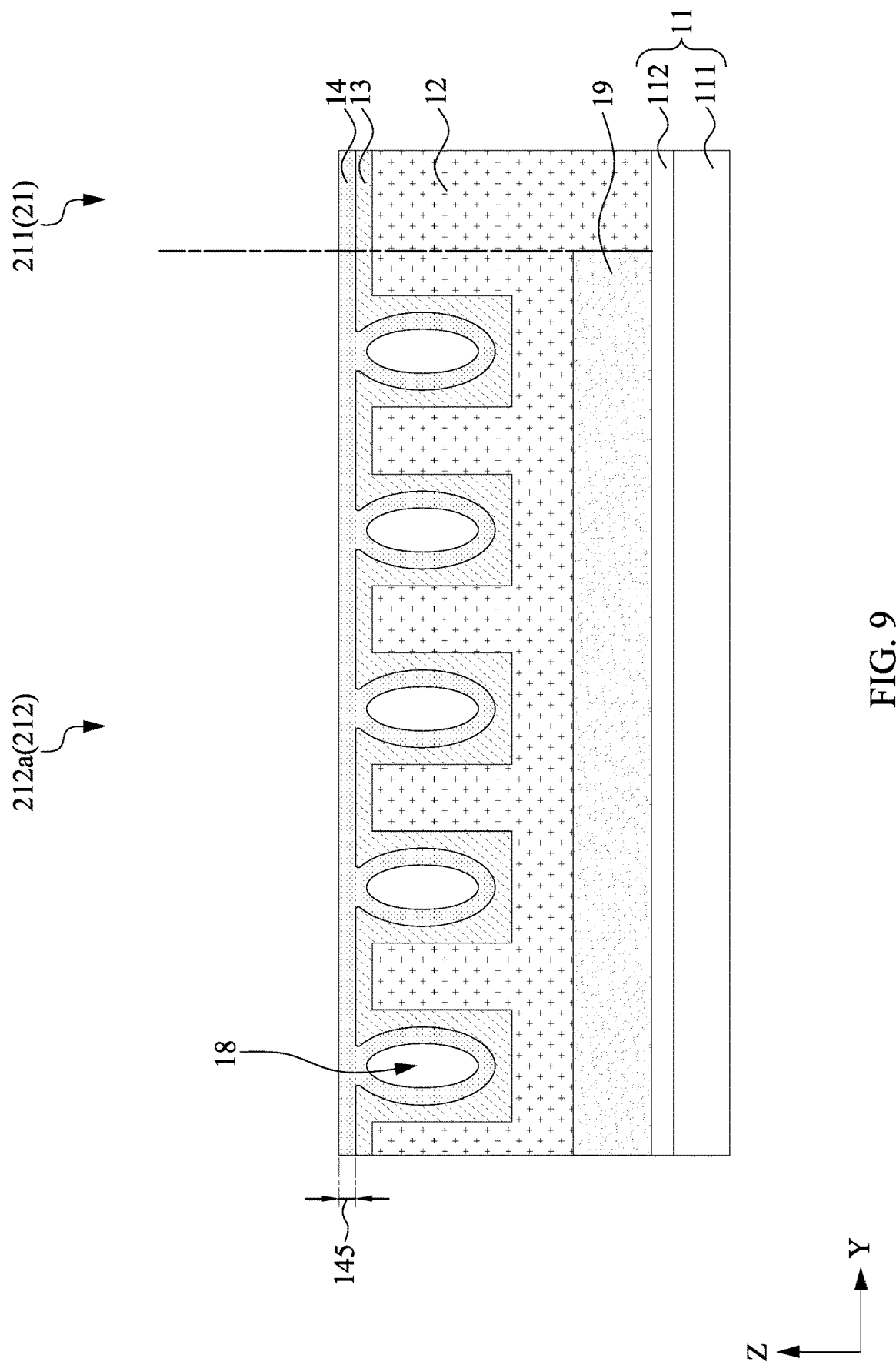

Please refer to FIG. 9, which is a schematic cross-sectional diagram along the line A-A' at a stage of the method 600 in accordance with some embodiments of the present disclosure. After the formation of the first soft material layer 13, the method 600 may further include forming a second soft material layer 14 over the first soft material layer 13, and an air gap 18 is formed in the first conductive layer 12 in the operation 604. In some embodiments, the second soft material layer 14 is formed by a deposition. In some embodiments, the second soft material layer 14 lines the open gap 171 in the trench 17. The formation of the second soft material layer 14 may be similar to the formation of the first soft material layer 13. In some embodiments, the second soft material layer 14 seals the open gap 171 to form the air gap 18 in the trench 17. In some embodiments, the air gap 18 is surrounded by the second soft material layer 14 and the first soft material layer 13. In some embodiments, the second soft material layer 14 is formed over the top surface 121 of the first conductive layer 12. In some embodiments, the second soft material layer 14 covers an entirety of the top surface 121. In some embodiments, a thickness 145 of the second soft material layer 14 over the top surface 121 is in a range of 2 nm to 80 μm.

Figure 10:
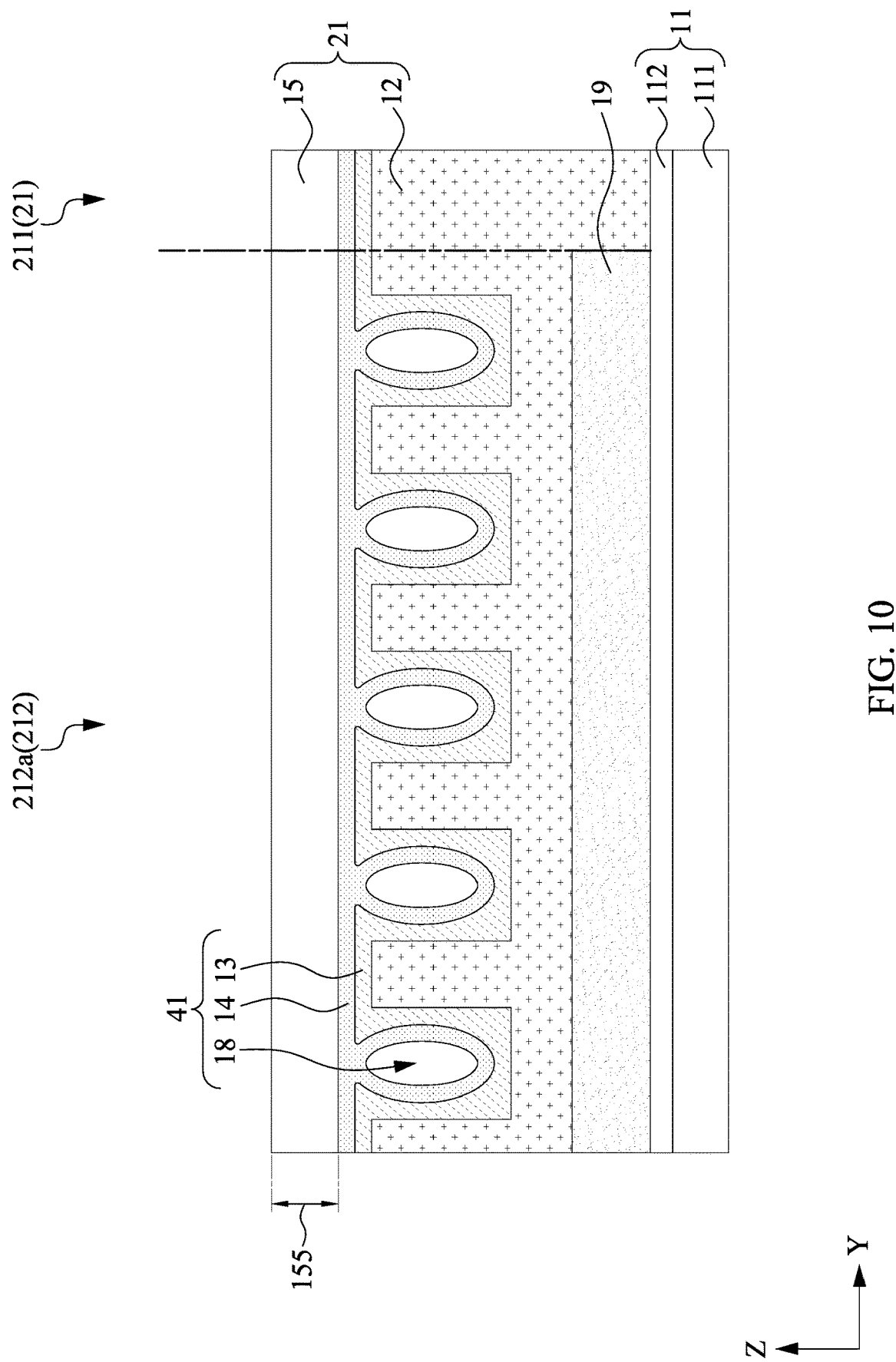

Please refer to FIG. 10, which is a schematic cross-sectional diagram along the line A-A' at a stage of the method 600 in accordance with some embodiments of the present disclosure. In the operation 605, a second conductive layer 15 is formed over the first conductive layer 12, the first soft material layer 13 and the second soft material layer 14. A material of the second conductive layer 15 may be same as or different from that of the first conductive layer 12. The material of the second conductive layer 15 may be one or more of the possible materials of the first soft material layer 13 as illustrated above, and repetition is omitted herein. In some embodiments, the second conductive layer 15 is formed by a deposition. In some embodiments, the second conductive 15 covers an entirety of the second soft material layer 14. In some embodiments, a thickness 155 of the second conductive layer is in a range of 10 nm to 200 μm.

The first soft material layer 13, the second soft material layer 14 and the air gap 18 may be collectively referred to as a buffering structure 41. In some embodiments, the second conductive layer 15 is separated from the first conductive layer 12 by the first soft material layer 13 and/or the second soft material layer 14 of the buffering structure 41. However, the disclosure is not limited thereto. In other embodiments, a patterning operation is performed on the buffering structure 41 prior to the formation of the second conductive layer and at least a portion of the second conductive layer 15 penetrates through the buffering structure 41 and contacts the first conductive layer 12.

Figure 11:
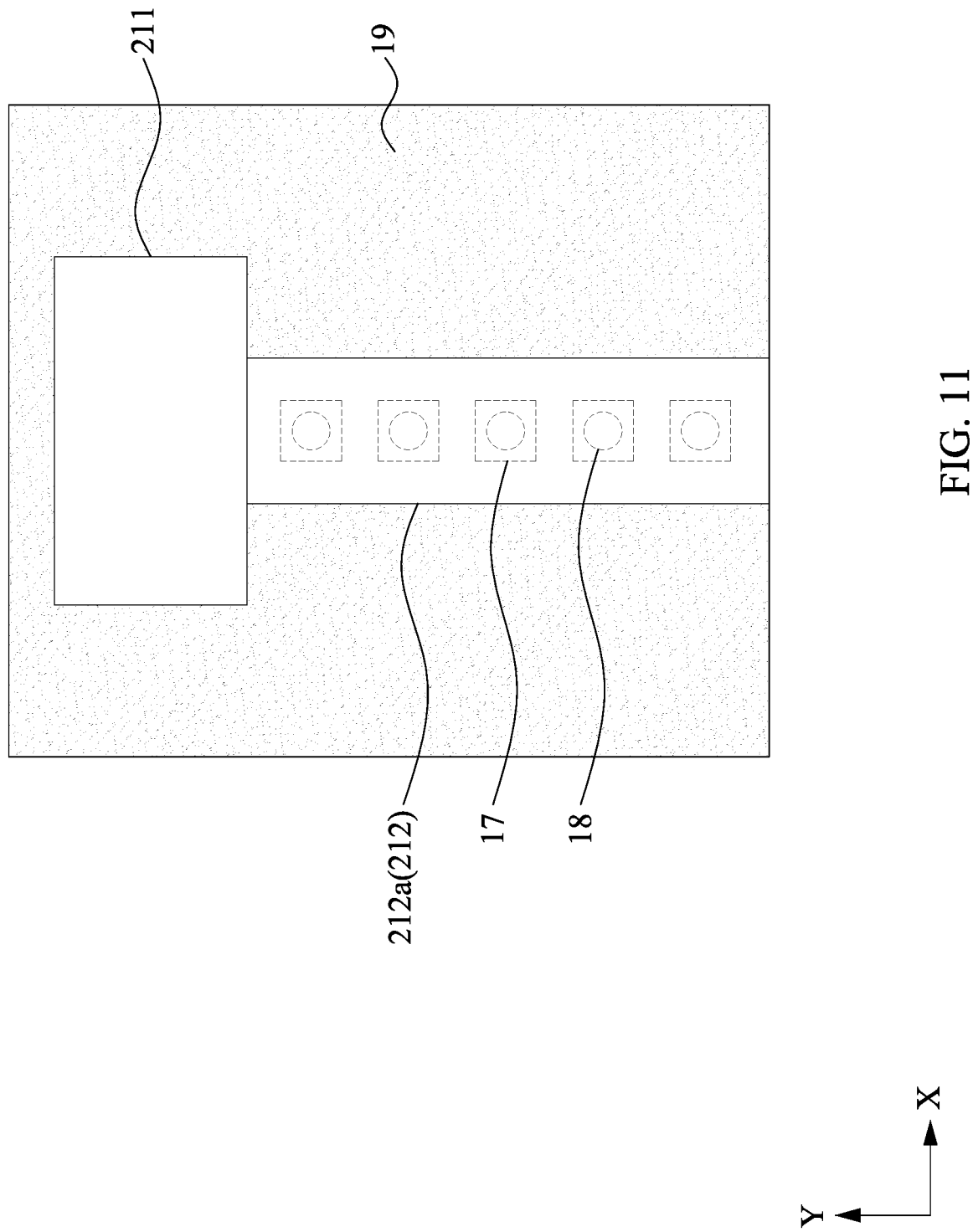

Please refer to FIG. 11, which is a schematic top view of an intermediate structure shown in FIG. 10 in accordance with some embodiments of the present disclosure. After the operation 605, the method 600 may further include performing a first patterning operation on the second conductive layer 15, the second soft material layer 14, the first soft material layer 13 and the first conductive layer 12 to form the fixed portion 211 and the first portion 212a of the floating portion 212. In other words, portions of the second conductive layer 15, the second soft material layer 14, the first soft material layer 13 and the first conductive layer 12 outside the area of the fixed portion 211 and floating portion 212 as shown in FIG. 11 are removed. Portions of the sacrificial layer 19 are thereby exposed. It should be noted that the figures show only a portion of the semiconductor structure for a purpose of illustration, but other portions of the first electrode 21 and an entirety of the second electrode 31 can be formed concurrently according to the method 600.

Figure 12:
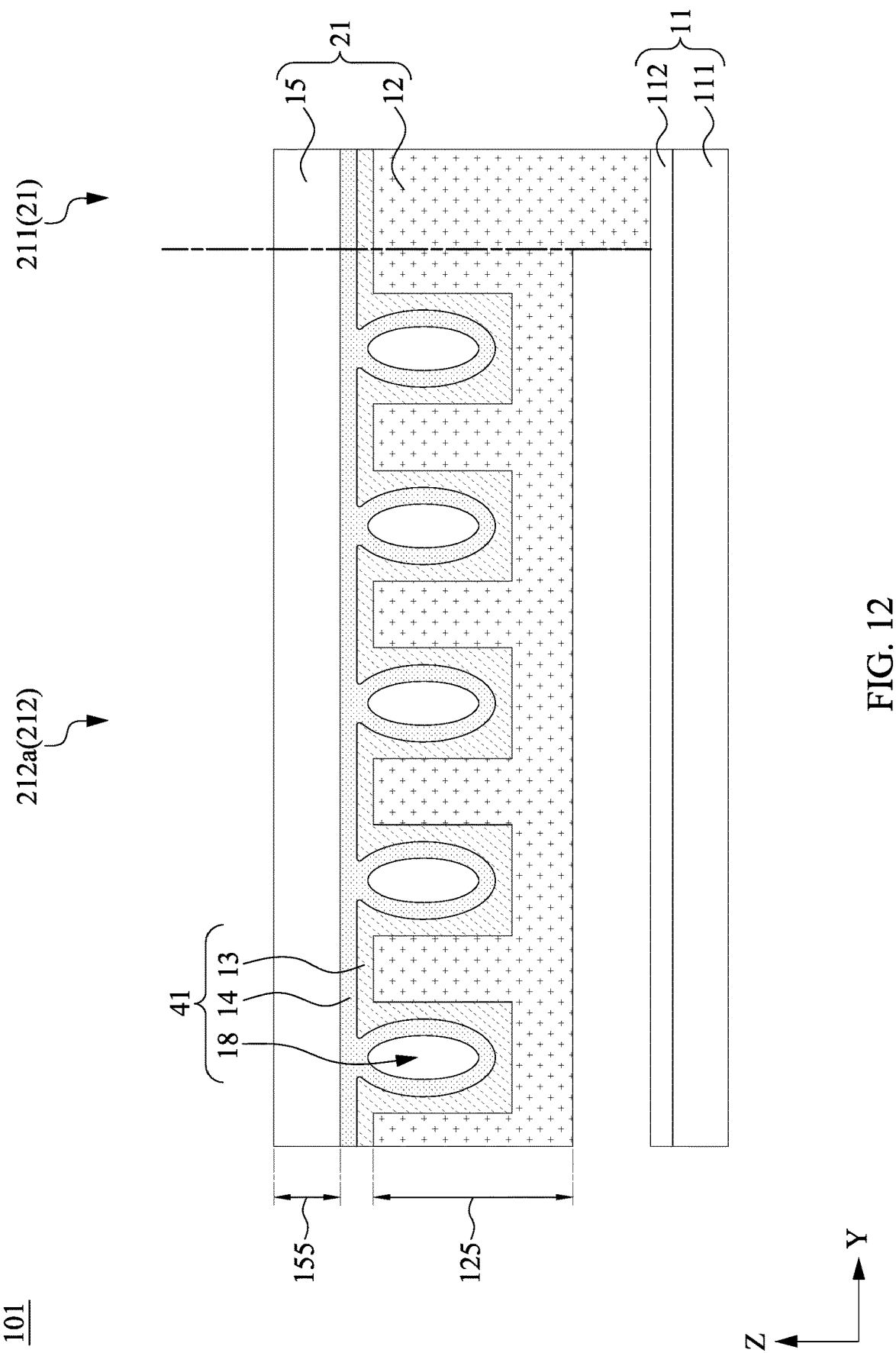

Please refer to FIG. 12, which is a schematic cross-sectional diagram along the line A-A' at a stage of the method 600 in accordance with some embodiments of the present disclosure. In the operation 606, the sacrificial layer 19 is removed. In some embodiments, an etching operation is performed to remove the sacrificial layer 19. In some embodiments, the etching operation includes a high selectivity to the material of the sacrificial layer 19. In some embodiments, the first patterning operation for defining the fixed portion 211 and the floating portion 212 is performed after the removal of the sacrificial layer 19. A semiconductor structure 101 similar to that shown in FIGS. 1 and 2 is thereby formed. A difference of the semiconductor structure 101 from that shown in FIG. 2 is that the fixed portion 211 in the semiconductor structure 101 includes a portion of the buffering structure 41, and the second conductive layer 15 is electrically isolated from the first conductive layer 12. In some embodiments, the thickness 155 of the second conductive layer 15 is less than the thickness 125 of the first conductive layer 12. In some embodiments, the first conductive layer 12 is used for detection of a change in capacitance, and the second conductive layer 12 is for a purpose of structural stability.

In the embodiments of the semiconductor structure 101, portions of second conductive layer 15, the second soft material layer 14, the first soft material layer 13 and the first conductive layer 12 together become the fixed portion 211. In some embodiments, the fixed portion 211 can be formed by another deposition.

Figure 13:
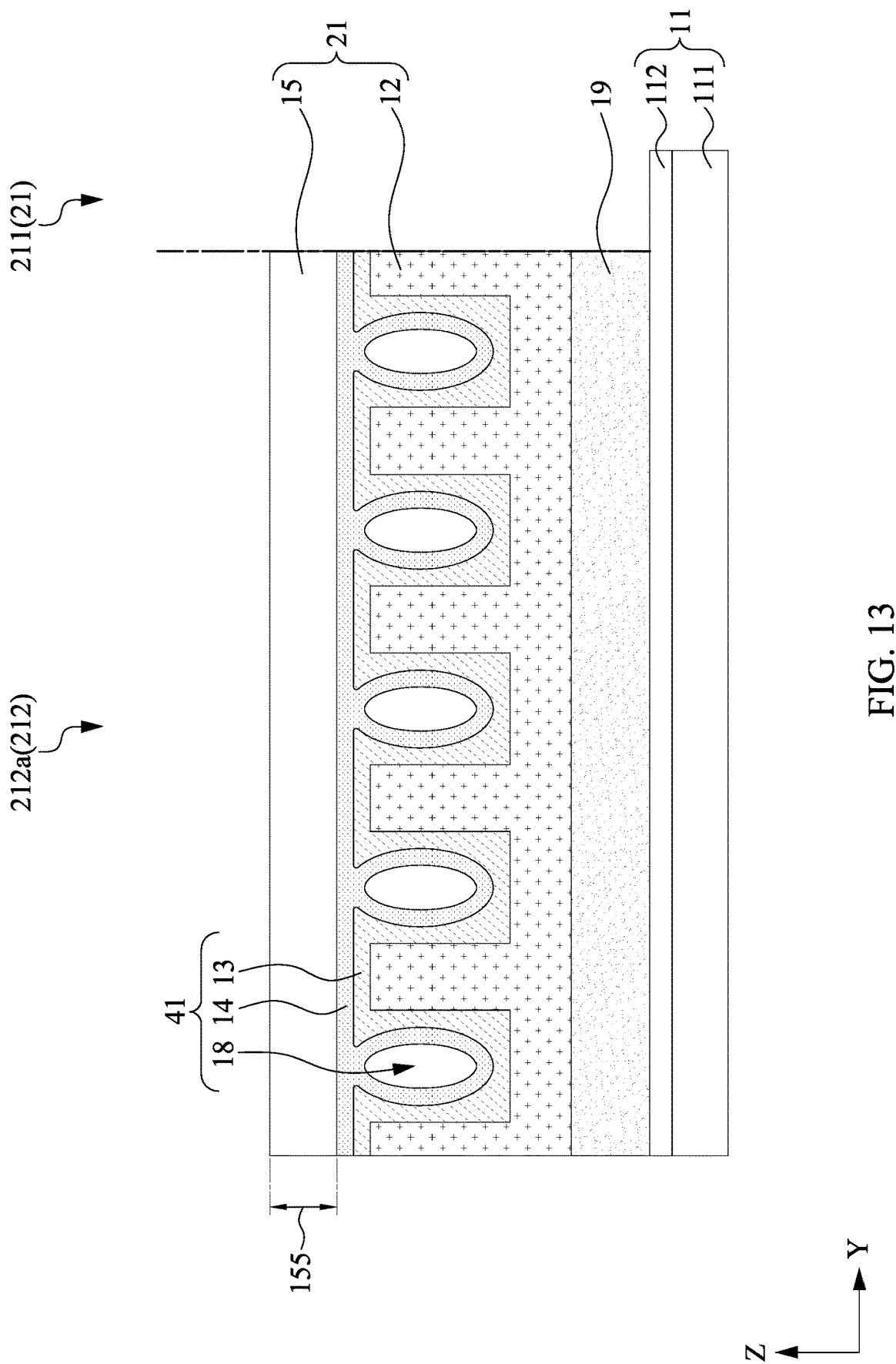
FIGS. 13 to 15 are schematic cross-sectional diagrams of a semiconductor structure at different stages of a manufacturing method in accordance with some embodiments of the disclosure.

Please refer to FIG. 13, which is a schematic cross-sectional diagram along the line A-A' at a stage of the method 600 in accordance with some embodiments of the present disclosure. In some embodiments, the portions of the second conductive layer 15, the second soft material layer 14, the first soft material layer 13 and the first conductive layer 12 comprising the fixed portion 211 in FIG. 11 are also removed by the first patterning operation. In some embodiments, a second patterning operation is performed prior to or after the first patterning operation to remove the portions of the second conductive layer 15, the second soft material layer 14, the first soft material layer 13 and the first conductive layer 12 comprising the fixed portion 211 in FIG. 11. In some embodiments, a portion of the substrate 11 is exposed.

Figure 14:
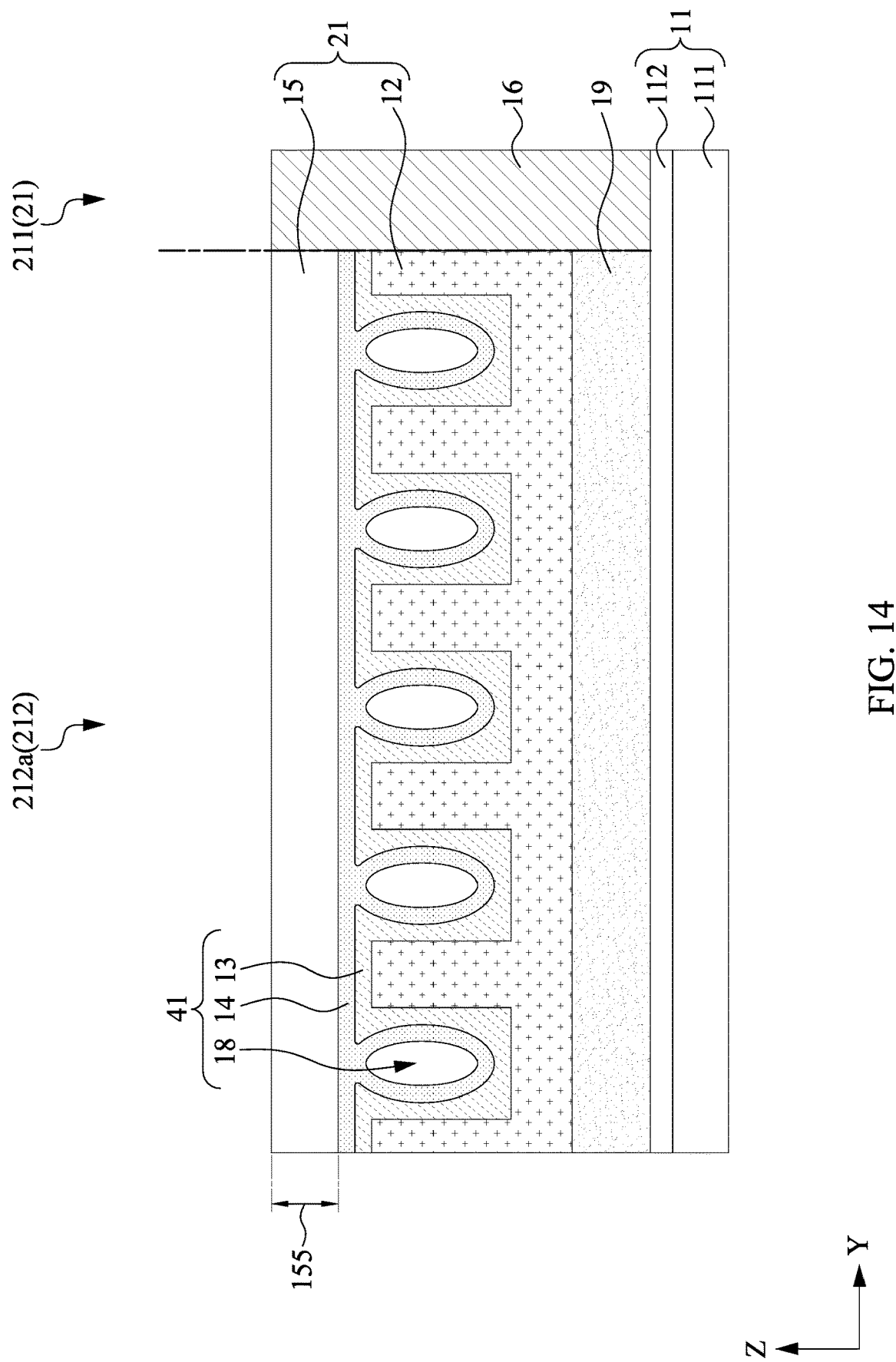

Please refer to FIG. 14, which is a schematic cross-sectional diagram along the line A-A' at a stage of the method 600 in accordance with some embodiments of the present disclosure. In some embodiments, a third conductive layer 16 is formed over the exposed portion of the substrate 11. In some embodiments, the third conductive layer 16 becomes the fixed portion 211. A material of the third conductive layer 16 may be one or more of the possible materials of the first conductive layer 12 illustrated above. The material of the third conductive layer 16 can be same as or different from that of the first conductive layer 12 and/or that of the second conductive layer 13.

Figure 15:
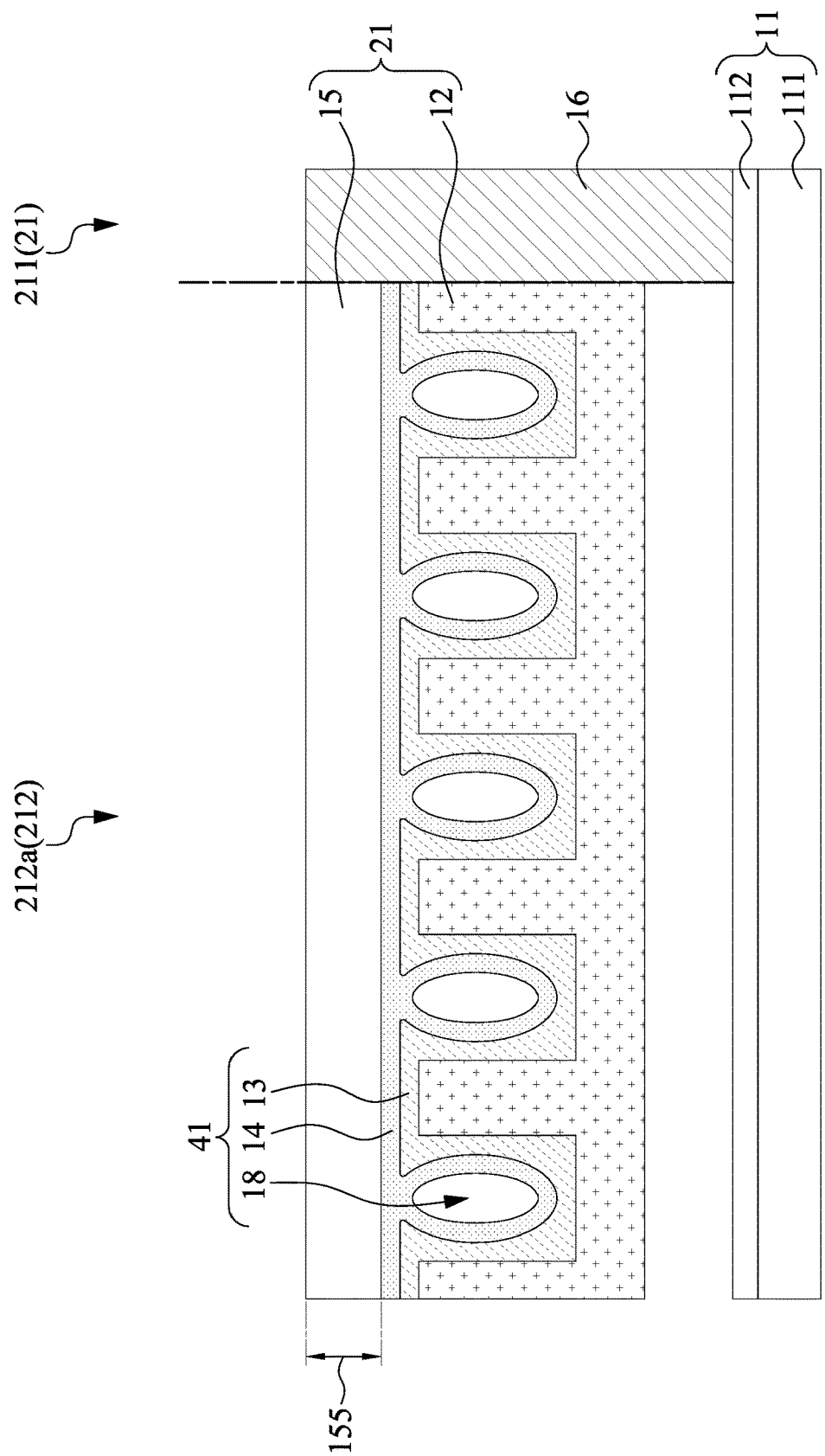

Please refer to FIG. 15, which is a schematic cross-sectional diagram along the line A-A' at a stage of the method 600 in accordance with some embodiments of the present disclosure. The sacrificial layer 19 is removed to form a semiconductor structure 102 similar to the semiconductor structure shown in FIG. 2.

The semiconductor structure 102 is an exemplary embodiment in which the first conductive layer 12 and the second conductive layer 13 are electrically connected. In other embodiments, a different patterning operation can be performed to electrically connect the first conductive layer 12 to the second conductive layer 13 without the formation of the third conductive layer 16.

Figure 16:
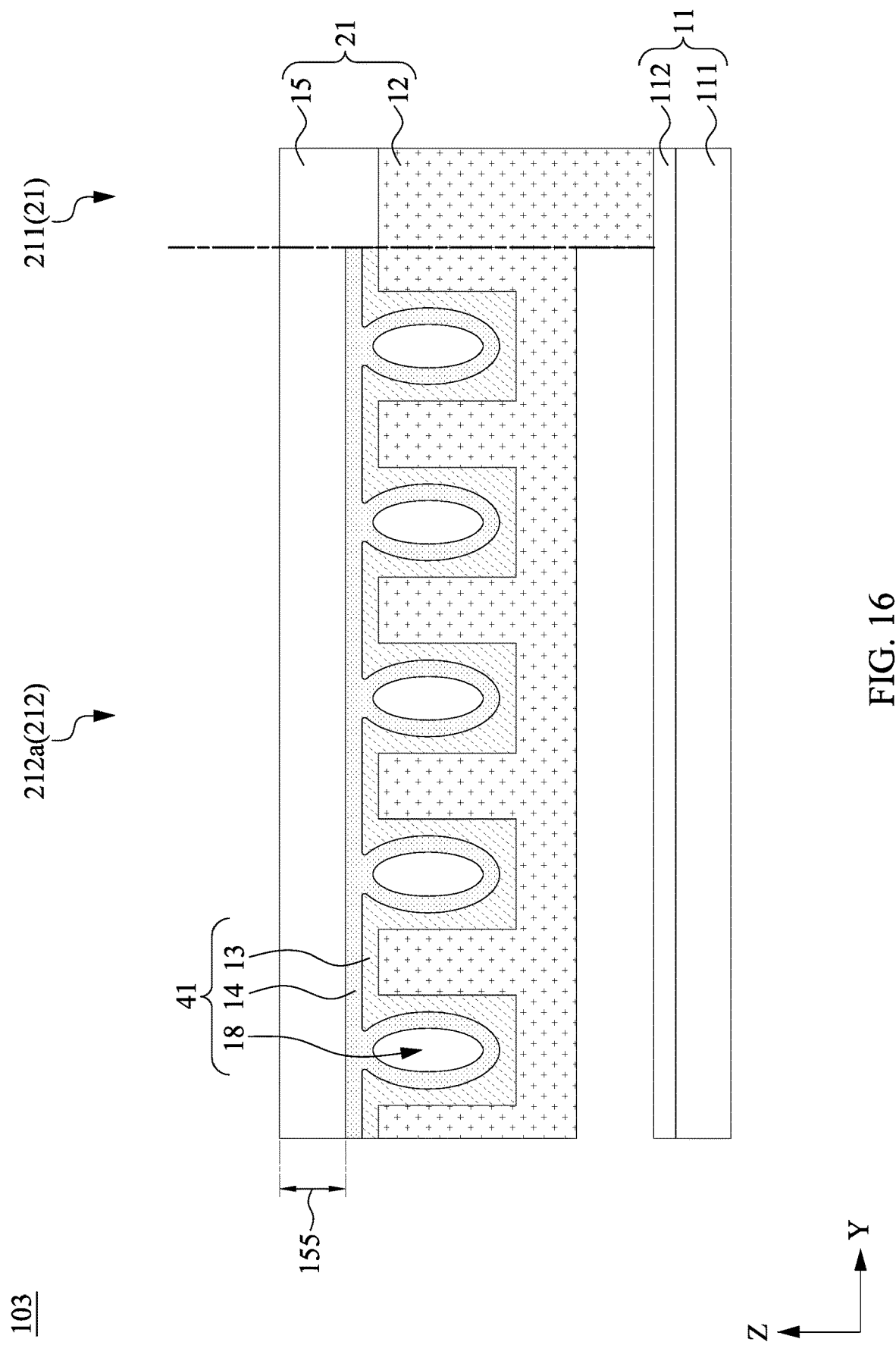
FIGS. 16 to 18 are schematic cross-sectional diagrams of semiconductor structures in accordance with different embodiments of the disclosure.

Please refer to FIG. 16, which is a schematic cross-sectional diagram along the line A-A' at a stage of the method 600 in accordance with some embodiments of the present disclosure. In some embodiments, a third patterning operation is performed to remove portions of the first soft material layer 13 and the second soft material layer 14 in the fixed portion 211 prior to the formation of the second conductive layer 15. In some embodiments, the second conductive layer 15 contacts the first conductive layer 12. In some embodiments, the fixed portion 211 includes portions of the second conductive layer 15 and the first conductive layer 12 with an absence of the first soft material layer 13 and the second soft material layer 14 disposed therebetween. A semiconductor structure 103 is thereby formed.

Figure 17:
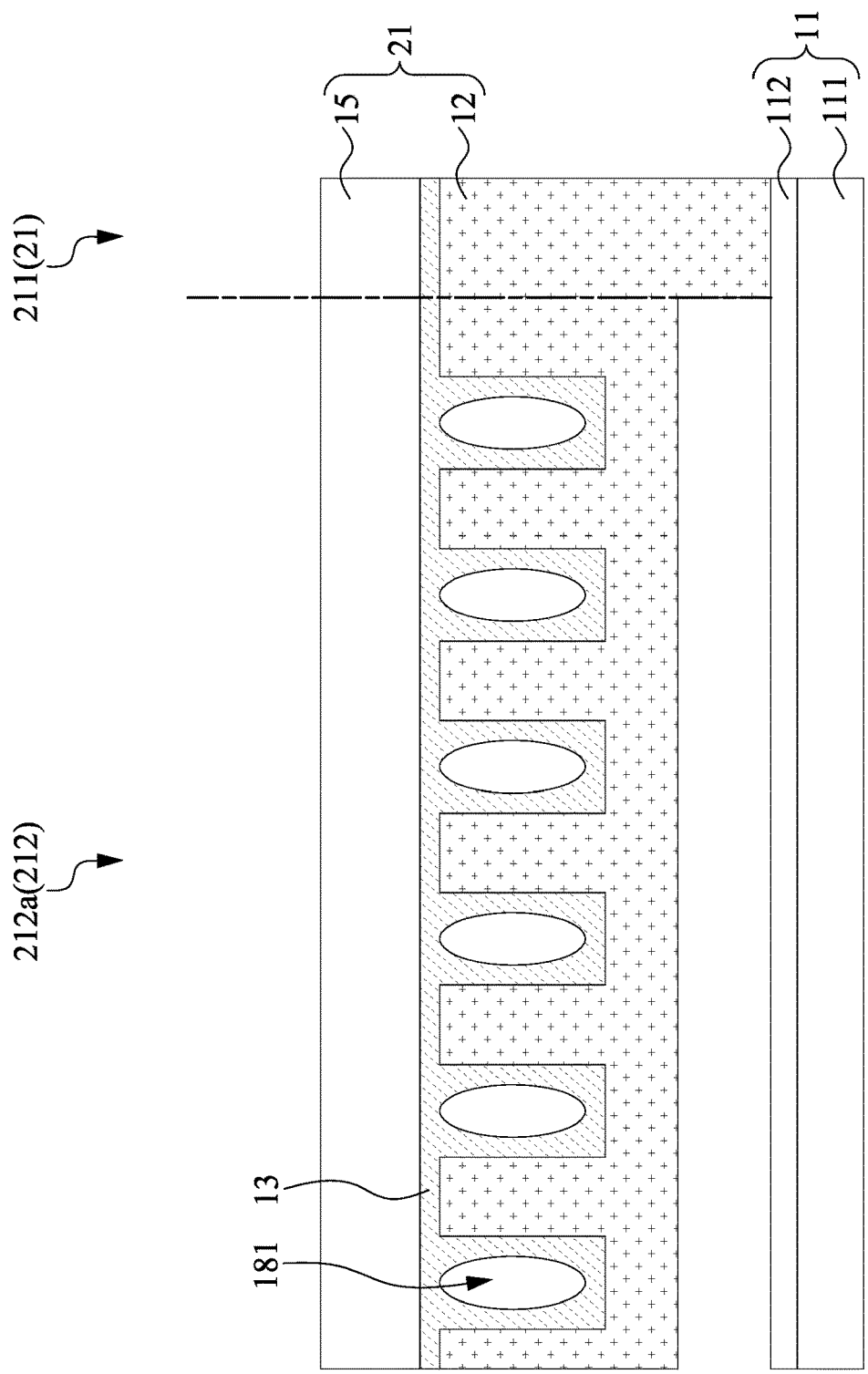

In some embodiments as illustrated above, the first soft material layer 13 may seal an opening of the trench 17 in the operation 603 due to the dimension of the trench 17. Please refer to FIG. 17, which is a schematic cross-sectional diagram along the line A-A' at a stage of the method 600 in accordance with some embodiments of the present disclosure. In some embodiments, an air gap 181 is sealed by the first soft material layer 13. In such embodiments, the formation of the second soft material layer 14 may be omitted. A semiconductor structure 104 is thereby formed.

In the embodiments illustrated above, the trenches 17 formed in the operation 603 include uniform dimensions (i.e., all the trenches 17 have same depths 175, same lengths 176 and same widths 177). In some embodiments, the trenches 17 may include different dimensions.

Figure 18:
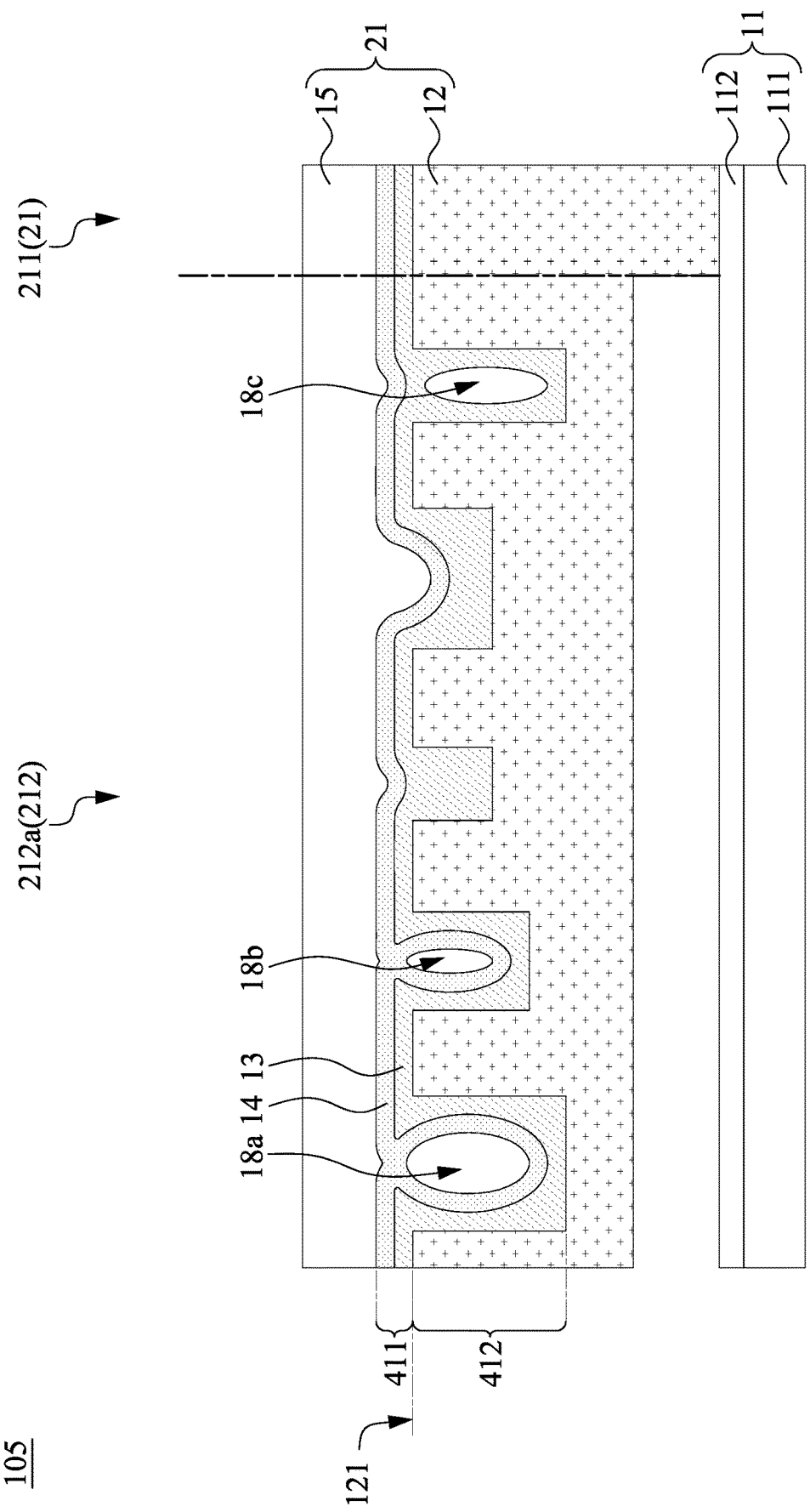

Please refer to FIG. 18, which is a schematic cross-sectional diagram along the line A-A' at a stage of the method 600 in accordance with some embodiments of the present disclosure. A semiconductor structure 105 is formed according to the method 600 as illustrated above, but the trenches 17 formed in the operation 602 include different depths, lengths and widths. In some embodiments, air gaps 18a, 18b and 18c are disposed in some of protruding portions 412 of the buffering structure 41. In some embodiments, the air gaps 18a, 18b and 18c are sealed by the second soft material layer 14 respectively with different sizes in different protruding portions. In some embodiments, the air gap 18c is sealed by the first soft material layer 13 in one of the protruding portions 412. In some embodiments, some of the protruding portions 412 do not include an air gap. In some embodiments, the first soft material layer 13 and the second soft material layer 14 include a curvature toward some of the protruding portions 412.

In accordance with some embodiments of the disclosure, a semiconductor structure is provided. The semiconductor structure includes a substrate, a pillar structure, a fin structure, and a buffering structure. The pillar structure is disposed on the substrate. The fin structure is connected to the pillar structure and is separate from the substrate. The buffering structure is disposed in the fin structure and includes a soft material layer and an air gap surrounded by the soft material layer.

In accordance with some embodiments of the disclosure, a semiconductor structure is provided. The semiconductor structure includes a substrate, an interdigital electrode and a soft structure. The interdigital electrode is disposed over the substrate, and includes a plurality of branch portions, wherein the branch portions are separated from the substrate. The soft structure is disposed in at least one of the branch portions and includes a plurality of protruding portions along a first direction substantially perpendicular to the substrate, wherein the soft structure includes an air gap in at least one of the protruding portions.

In accordance with some embodiments of the disclosure, a method for manufacturing a semiconductor structure is provided. The method may include several operations. A first conductive layer is formed over a substrate, wherein the first conductive layer includes a fixed portion connected to the substrate, and a floating portion connected to the fixed portion and separated from the substrate by a sacrificial layer. A first trench is formed in the first conductive layer. A first soft material layer is formed in the first trench and over the first conductive layer. An air gap is formed and sealed in the first trench. A second conductive layer is formed over the first conductive layer. The sacrificial layer is removed.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor structure, comprising:
   forming a first conductive layer over a substrate, wherein the first conductive layer includes a fixed portion connected to the substrate and a floating portion connected to the fixed portion and separated from the substrate by a sacrificial layer;
   forming a first trench in the first conductive layer, wherein a bottom of the first trench is separated from the sacrificial layer by the first conductive layer;
   forming a first soft material layer in the first trench and over the first conductive layer;
   forming an air gap sealed in the first trench;
   forming a second conductive layer over the first conductive layer, wherein the second conductive layer is separated from the air gap; and
   removing the sacrificial layer.

2. The method of claim 1, wherein the air gap is sealed by the first soft material layer.

3. The method of claim 1, further comprising:
   forming a second soft material layer lining the first soft material layer,
   wherein the air gap is sealed by the second soft material layer.

4. The method of claim 1, further comprising forming a second trench in the first conductive layer, wherein a width and/or a depth of the second trench is different from that of the first trench.

5. A method of manufacturing a semiconductor structure, comprising:
   forming a sacrificial layer over a substrate;
   forming a first conductive layer over the sacrificial layer, wherein the first conductive layer comprises a first portion coupled to the substrate and a second portion separated from the substrate;
   forming a trench in the first conductive layer after the forming of the first conductive layer over the sacrificial layer;
   forming a soft material layer to seal the trench and to form an air gap therein;
   forming a second conductive layer over the soft material layer; and
   removing the sacrificial layer after the sealing of the trench.

6. The method of claim 5, wherein the trench is separated from the first portion of the first conductive layer.

7. The method of claim 5, wherein the forming of the soft material layer further comprises:
   forming a first layer in the trench and over the first conductive layer; and
   forming a second layer over the first layer and to form the air gap therein.

8. The method of claim 7, wherein the first layer and the second layer comprise different materials.

9. The method of claim 5, further comprising removing a portion of the soft material layer to expose a portion of the first conductive layer.

10. The method of claim 9, wherein the second conductive layer is in contact with the portion of the first conductive layer exposed through the soft material layer.

11. The method of claim 5, wherein a thickness of the first portion of the first conductive layer is greater than a thickness of the second portion of the first conductive layer.

12. A method of manufacturing a semiconductor structure, comprising:
receiving a substrate comprising a dielectric layer formed thereon;
forming a sacrificial layer over the dielectric layer;
forming a first conductive layer over the sacrificial layer, wherein the first conductive layer comprises a first portion coupled to the dielectric layer and a second portion separated from the dielectric layer, the first portion has a first thickness measured from a topmost surface of the first portion to a bottommost surface of the first portion, the second portion has a second thickness measured from a topmost surface of the second portion to a bottommost surface of the second portion, and the first thickness is greater than the second thickness;
forming a trench in the second portion of the first conductive layer;
forming a soft material layer in the trench, wherein an air gap is sealed in the trench by the soft material layer;
forming a second conductive layer over the soft material layer; and
removing the sacrificial layer.

13. The method of claim 12, wherein the second conductive layer is separated from the first conductive layer by the soft material layer.

14. The method of claim 12, wherein the dielectric layer has a first portion exposed through the sacrificial layer and a second portion covered by the sacrificial layer.

15. The method of claim 14, wherein the first portion of the first conductive layer is coupled to the first portion of the dielectric layer.

16. The method of claim 14 wherein the second portion of the dielectric layer is exposed after the removing of the sacrificial layer.

17. The method of claim 12, wherein the second conductive layer and the first conductive layer comprise a same material.

18. The method of claim 12, wherein the second conductive layer and the first conductive layer comprise different materials.

19. The method of claim 12, further comprising performing a patterning operation on the second conductive layer, the soft material layer and the first conductive layer to expose portions of the sacrificial layer.

20. The method of claim 19, wherein the removing of the sacrificial layer is performed after the patterning operation.

* * * * *